(12) United States Patent
Ishihara et al.

(10) Patent No.: US 12,459,767 B2
(45) Date of Patent: Nov. 4, 2025

(54) OPEN AND CLOSE DEVICE, SHEET CONVEYOR, AND IMAGE FORMING APPARATUS

(71) Applicants: Hiroki Ishihara, Kanagawa (JP); Kenji Nozawa, Kanagawa (JP); Takehiro Nakamura, Ibaraki (JP)

(72) Inventors: Hiroki Ishihara, Kanagawa (JP); Kenji Nozawa, Kanagawa (JP); Takehiro Nakamura, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 18/492,060

(22) Filed: Oct. 23, 2023

(65) Prior Publication Data

US 2024/0158191 A1    May 16, 2024

(30) Foreign Application Priority Data

Nov. 11, 2022    (JP) .................................. 2022-181165

(51) Int. Cl.
  *G03G 21/16*    (2006.01)
  *B65H 5/02*    (2006.01)

(52) U.S. Cl.
  CPC ......... *B65H 5/02* (2013.01); *B65H 2402/441* (2013.01); *B65H 2402/54* (2013.01)

(58) Field of Classification Search
  CPC ............... B65H 5/02; B65H 2402/441; B65H 2402/54; B41J 11/0015; B41J 11/007; B41J 29/02; B41J 29/13; G03G 21/16; G03G 21/1638; G03G 21/1623
  USPC ....................................................... 399/124
  See application file for complete search history.

(56) References Cited

U.S. PATENT DOCUMENTS

| | | | | |
|---|---|---|---|---|
| 6,615,019 B2* | 9/2003 | Fujimoto | ............. | G03G 15/605 355/75 |
| 6,793,419 B2* | 9/2004 | Nebashi | ................. | B41J 15/042 400/621 |
| 7,418,766 B2* | 9/2008 | Nelson | ................. | G03G 15/605 16/369 |

(Continued)

FOREIGN PATENT DOCUMENTS

| | | |
|---|---|---|
| JP | 2000-229745 A | 8/2000 |
| JP | 2001-058751 A | 3/2001 |

(Continued)

OTHER PUBLICATIONS

Extended European Search Report dated Apr. 11, 2024 issued in corresponding European Appln. No. 23205470.0.

*Primary Examiner* — Leslie A Nicholson, III
(74) *Attorney, Agent, or Firm* — Harness, Dickey & Pierce, P.L.C.

(57) ABSTRACT

An open and close device, a sheet conveyor, and an image forming apparatus. The open and close device includes an open and close portion to open or shut, a biasing mechanism to bias the open and close portion in an opening direction, and a holder to hold the open and close portion shut. The biasing mechanism includes a first spring whose biasing force is invariable regardless of a stroke of the first spring, and a second spring whose biasing force is variable due to a stroke of the second spring. The sheet conveyor includes the open and close device, and the open and close portion includes a conveyor to convey a sheet. The image forming apparatus includes the sheet conveyor.

10 Claims, 5 Drawing Sheets

(56) References Cited

U.S. PATENT DOCUMENTS

| | | |
|---|---|---|
| 2002/0085868 A1 | 7/2002 | Fujimoto |
| 2019/0202215 A1 | 7/2019 | Asada et al. |
| 2019/0204767 A1 | 7/2019 | Ishihara et al. |
| 2020/0290383 A1 | 9/2020 | Ishihara et al. |
| 2022/0073295 A1 | 3/2022 | Ishihara et al. |
| 2022/0236678 A1 | 7/2022 | Numata |
| 2023/0303333 A1 | 9/2023 | Ishihara et al. |

FOREIGN PATENT DOCUMENTS

| | | |
|---|---|---|
| JP | 2018-043818 A | 3/2018 |
| JP | 2022-043989 A | 3/2022 |
| JP | 2023-140943 A | 10/2023 |

* cited by examiner

OPEN AND CLOSE DEVICE, SHEET CONVEYOR, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-181165, filed on Nov. 11, 2022, in the Japan Patent Office, the entire disclosure of which is hereby incorporated by reference herein.

BACKGROUND

Technical Field

Embodiments of the present disclosure relate to an open and close device, a sheet conveyor, and an image forming apparatus.

Background Art

A sheet conveyor has been proposed that is disposed downstream from a drying device provided for an image forming apparatus and includes a cooling member. Such a sheet conveyor serves as an open and close device that conveys a sheet.

Such a sheet conveyor includes a pair of slidably rotatable conveying belts and rotates the conveying belts to convey, from upstream to downstream, a sheet nipped at the nip between the pair of conveying belts. One of the pair of conveying belts turns relative to the other conveying belt so as to be spaced from the other conveying belt, resulting in the achievement of the function of an open and close portion enabling exposure of the inside of the sheet conveyor. Opening between the conveying belts enables the handling of paper jam or the replacement of internal members.

For example, a sheet conveyor has been proposed that is provided with a tension spring to bias an upper conveying belt in the opening direction. Typically, such a sheet conveyor is provided with a locking claw that locks the upper conveying belt shut to a lower conveying belt.

In the case where an open and close portion provided for an open and close device is large in weight, an operator needs a large manipulation force for open/shut operation. According to the above configuration of the sheet conveyor in the related art, the upper conveying belt is urged in the opening direction due to the biasing force in the direction of contraction of the tension spring, leading to a reduction in the manipulation force in the opening direction. However, as the upper conveying belt turns in the direction of shutting, the stroke of the tension spring increases, and the biasing force in the opening direction increases. Such increases tend to require a large manipulation force to shut the upper conveying belt.

SUMMARY

Embodiments of the present disclosure described herein provide an open and close device, a sheet conveyor, and an image forming apparatus. The open and close device includes an open and close portion to open or shut, a biasing mechanism to bias the open and close portion in an opening direction, and a holder to hold the open and close portion shut. In the open and close device, the biasing mechanism includes a first spring whose biasing force is invariable regardless of a stroke of the first spring, and a second spring whose biasing force is variable due to a stroke of the second spring. The sheet conveyor includes the open and close device, and the open and close portion includes a conveyor to convey a sheet. The image forming apparatus includes the sheet conveyor.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
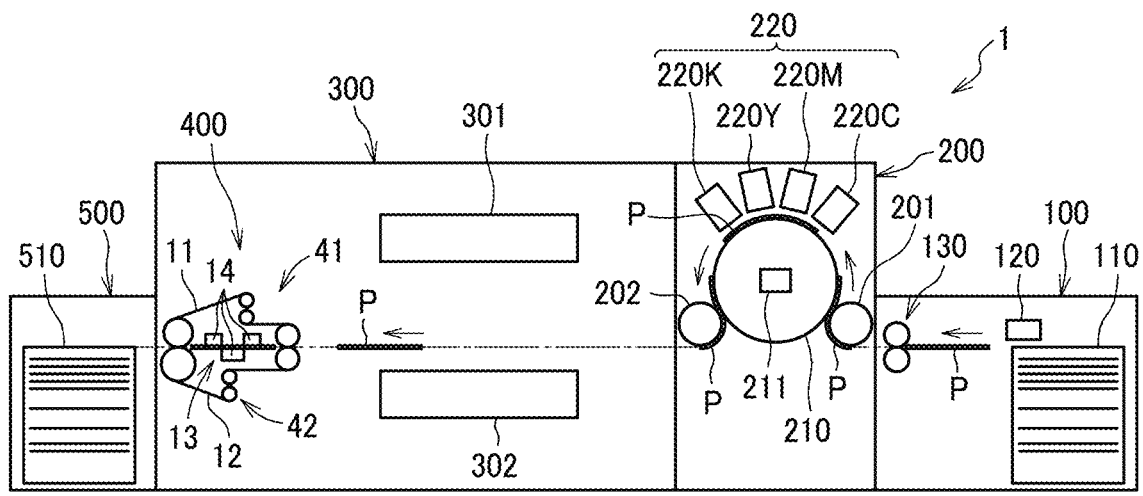
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the drawings.

FIG. 1 is a schematic diagram illustrating a configuration of an image forming apparatus 1 that adopts inkjet printing, according to an embodiment of the present disclosure.

Typically, an image forming apparatus 1 according to the present embodiment includes a feeder 100, an image former 200, a dryer 300, and an ejector 500. The dryer 300 is provided with a sheet conveyor 400 as an open and close device. The sheet conveyor 400 that serves as an open and close device according to the embodiments of the present disclosure conveys a sheet. As an example of such a sheet, there is a recording medium for recording an image. The sheet conveyor 400 according to the present embodiment conveys a sheet P that serves as such a recording medium.

In the image forming apparatus 1, the image former 200 forms, with ink as liquid for image forming, an image onto the sheet P fed from the feeder 100. In the image forming apparatus 1, the dryer 300 dries the ink on the sheet P and then ejects the sheet P to the ejector 500.

Typically, the feeder 100 includes a sheet feeding tray 110, a feeding device 120, and a pair of registration rollers 130. A plurality of sheets P is stacked on the sheet feeding tray 110. The feeding device 120 sends out sheets P one by one from the sheet feeding tray 110. The pair of registration rollers 130 sends a sheet P into the image former 200. The feeding device 120 may be any type of feeding device such as a feeding device including a roller or a rolling member or a feeding device with air suction. After the leading end of the sheet P sent out from the sheet feeding tray 110 by the feeding device 120 reaches the pair of registration rollers 130, the pair of registration rollers 130 operates at a predetermined timing to feed the sheet P to the image former 200. The feeder 100 may have any configuration, provided that a sheet P can be sent out to the image former 200.

The image former 200 includes a receiving barrel 201 and a sheet bearing drum 210. The receiving barrel 201 receives the fed sheet P. The sheet bearing drum 210 conveys the sheet P conveyed by the receiving barrel 201 while bearing the sheet P on its outer circumferential face. The image former 200 includes an ink discharger 220 and a delivery barrel 202. The ink discharger 220 discharges ink to the sheet P borne on the sheet bearing drum 210. The delivery barrel 202 delivers, to the dryer 300, the sheet P conveyed by the sheet bearing drum 210. The leading end of the sheet P conveyed from the feeder 100 to the image former 200 is gripped by a sheet gripper arranged on the surface of the receiving barrel 201. Then, the sheet P is conveyed along with the movement of the surface of the receiving barrel 201. The sheet P conveyed by the receiving barrel 201 is delivered to the sheet bearing drum 210 at a position at which the sheet P faces the sheet bearing drum 210.

The sheet bearing drum 210 has a surface provided with a sheet gripper. The leading end of the sheet P is gripped by the sheet gripper. The sheet bearing drum 210 has a plurality of suction holes dispersed on its surface. A suction device 211 generates, to each suction hole, an air flow of suction to the inside of the sheet bearing drum 210. The sheet P delivered from the receiving barrel 201 to the sheet bearing drum 210 is sucked on the surface of the sheet bearing drum 210 due to air flows of suction, with its leading end gripped by the sheet gripper. Then, the sheet P is conveyed along with the movement of the surface of the sheet bearing drum 210.

The ink discharger 220 includes liquid discharge heads 220C, 220M, 220Y, and 220K for inks in four colors of cyan (C), magenta (M), yellow (Y), and black (K), in order to discharge the four color inks to form an image. The liquid discharge heads 220C, 220M, 220Y, and 220K may each have any configuration, provided that liquid can be discharged. For example, where appropriate, a liquid discharge head that discharges a special ink such as white ink, gold ink, or silver ink may be arranged, or a liquid discharge head that discharges liquid not for forming an image such as surface coating liquid may be arranged.

Due to drive signals based on image information, the liquid discharge heads 220C, 220M, 220Y, and 220K of the ink discharger 220 are controlled in the discharging operation. At the time of passage of the sheet P borne on the sheet bearing drum 210 through the region in which the sheet P faces the ink discharger 220, the liquid discharge heads 220C, 220M, 220Y, and 220K discharge the respective color inks to form an image corresponding to the image information. The image former 200 may have any configuration, provided that the image former 200 causes liquid to adhere to a sheet P to form an image.

The dryer 300 includes a drying mechanism 301 and a conveying mechanism 302. The drying mechanism 301 dries the ink adhering on the sheet P due to the image former 200. The conveying mechanism 302 conveys the sheet P conveyed from the image former 200. The sheet P conveyed from the image former 200 is received by the conveying mechanism 302 and then is conveyed while passing the drying mechanism 301, followed by delivery to the sheet conveyor 400. While the sheet P is passing the drying mechanism 301, the ink on the sheet P is subjected to drying. Thus, a liquid component such as moisture, in the ink evaporates, so that the ink fastens on the sheet P and additionally the sheet P is prevented from curling.

The sheet conveyor 400 includes an upper conveyance module 41 and a lower conveyance module 42 that convey a sheet P. The sheet conveyor 400 according to the present embodiment serves as a cooling device that cools the sheet P having passed the drying mechanism 301. The sheet conveyor 400 cools the sheet P being conveyed and delivers the cooled sheet P to the ejector 500 on the downstream side.

The upper conveyance module 41 and the lower conveyance module 42 are provided with a cooler 13 inside. The cooler 13 includes a plurality of cooling members 14. Each cooling member 14 abuts on the inner face of an upper conveying belt 11 or a lower conveying belt 12. Each cooling member 14 is coupled to the cooling device through a channel pipe and a tube. Due to a flow of cooling liquid as a coolant from the cooling device to each cooling member 14 through the channel pipe, the sheet P being conveyed by the upper conveying belt 11 and the lower conveying belt 12 is cooled.

The ejector 500 includes a sheet ejection tray 510 on which a plurality of sheets P can be stacked. The sheet P conveyed from the dryer 300 is stacked and retained in order on the sheet ejection tray 510. The ejector 500 may have any configuration, provided that a sheet P can be ejected.

The image forming apparatus 1 according to the present embodiment that serves as an open and close device is provided with the sheet conveyor 400 that conveys a sheet. The sheet conveyor 400 is described below in detail with reference to FIG. 2, FIG. 3, FIG. 4, and FIG. 5.

Figure 2:
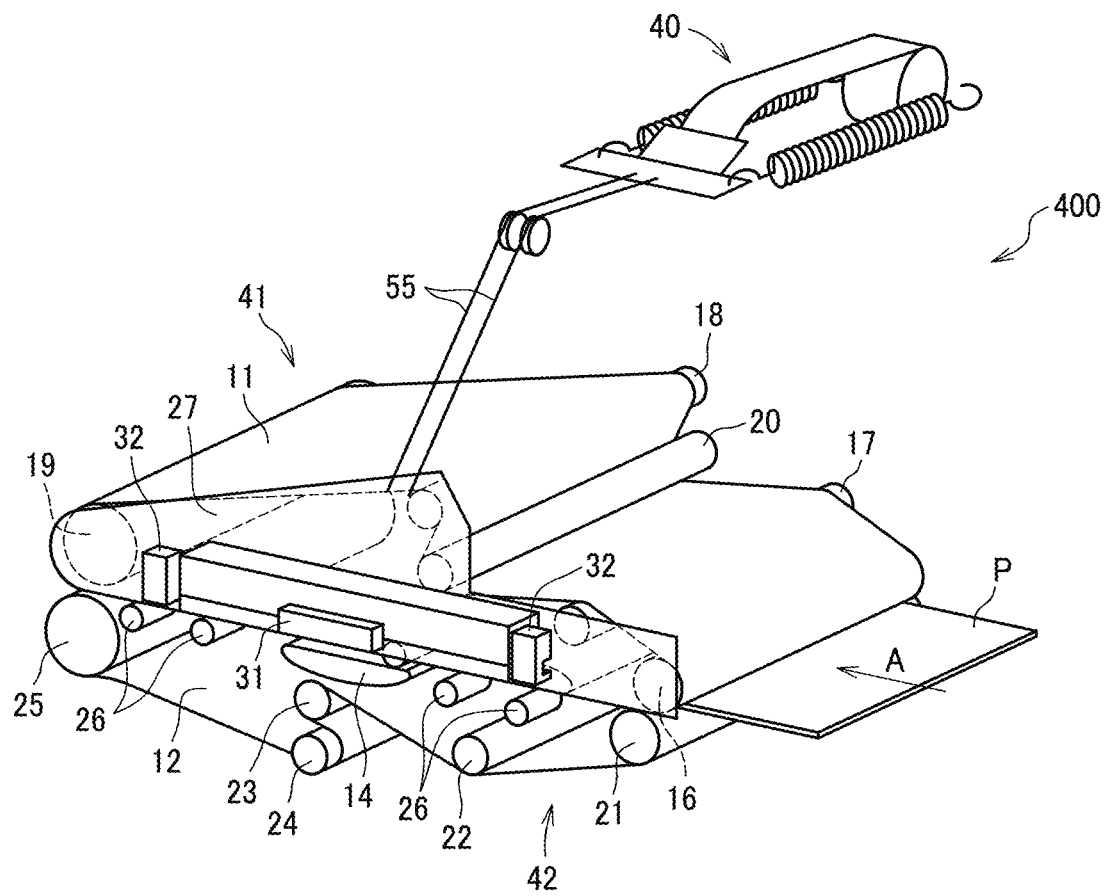
FIG. 2 is a perspective view of a sheet conveyor according to an embodiment of the present disclosure.

FIG. 2 is a perspective view of the sheet conveyor 400 according to the present embodiment.

As illustrated in FIG. 2, the sheet conveyor 400 includes the upper conveyance module 41 as an open and close portion, the lower conveyance module 42, and a hoisting mechanism 40 as a biasing mechanism. The open and close portion according to the embodiments of the present disclosure serves as a conveyor that conveys a sheet. The open and close device according to the embodiments of the present disclosure is not limited to a sheet conveyor, and can be applied to any open and close device provided with an open and close portion.

The upper conveying belt 11 is stretched around a plurality of rollers 16 to 20. The lower conveying belt 12 is stretched around a plurality of rollers 21 to 26. The upper conveying belt 11 and the lower conveying belt 12 run circumferentially, so that the sheet P is conveyed in the direction of an arrow A while being nipped at the nip between the upper conveying belt 11 and the lower conveying belt 12.

Figure 3:
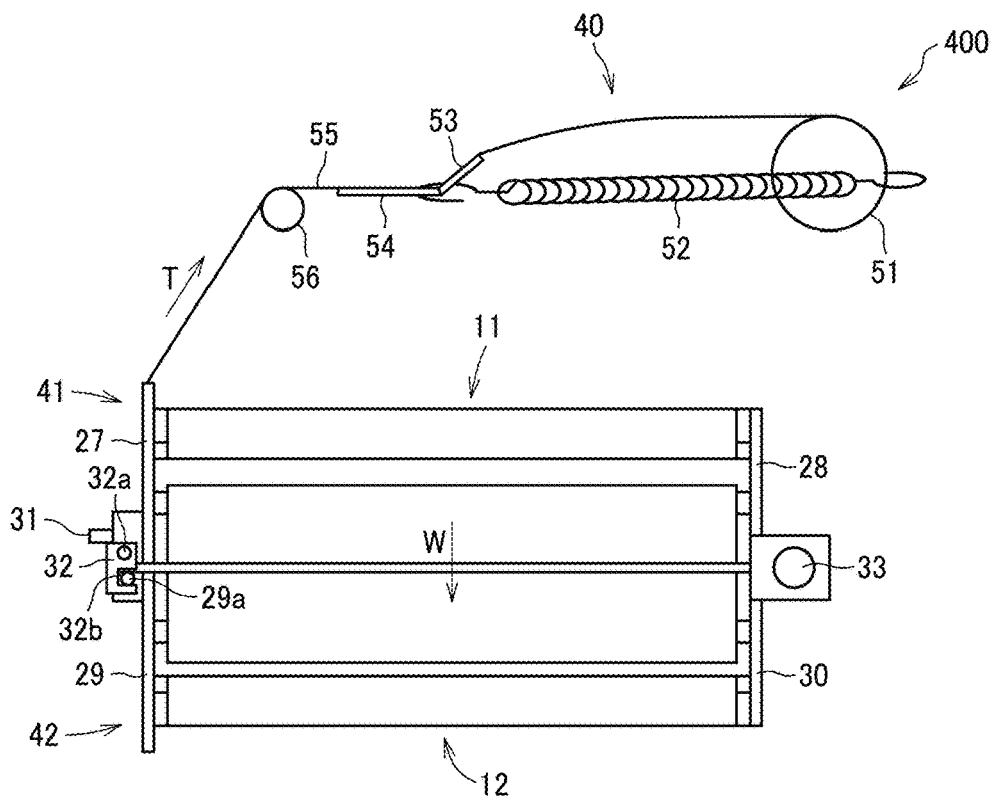
FIG. 3 is a side view of the sheet conveyor of FIG. 2 with an upper conveyance module shut, according to an embodiment of the present disclosure.

FIG. 3 is a side view of the sheet conveyor 400 of FIG. 2 with the upper conveyance module 41 shut, according to the present embodiment.

Each one of the multiple rollers 16 to 20 that stretch the upper conveying belt 11 has an end in the axial direction, and that end is supported by an upper front plate 27. As illustrated in FIG. 3, the other end of each one of the multiple rollers 16 to 20 is supported by an upper rear plate 28. Each one of the multiple rollers 21 to 26 that stretch the upper conveying belt 12 has an end in the axial direction, and that end is supported by a lower front plate 29. As illustrated in FIG. 3, the other end of each one of the multiple rollers 21 to 26 is supported by a lower rear plate 30. The upper conveyance module 41 includes, for example, the upper conveying belt 11, the multiple rollers 16 to 20, the upper front plate 27, the upper rear plate 28, and the cooling member 14 inside the upper conveying belt 11. The lower conveyance module 42 includes, for example, the lower conveying belt 12, the rollers 21 to 26, the lower front plate 29, the lower rear plate 30, and the cooling member 14 inside the lower conveying belt 12.

As illustrated in FIG. 2, the upper front plate 27 is provided with a handle 31 and a pair of locking portions 32. The handle 31 is provided at the center in the width direction of the upper front plate 27. The hoisting mechanism 40 urges, through a wire 55 coupled to the upper front plate 27, the upper conveyance module 41 upward against gravity.

As illustrated in FIG. 3, each one of the pair of locking portions 32 is arranged around a rotation shaft 32a in a rotatable manner. The rotation shaft 32a has its axial direction identical to the direction perpendicular to the drawing plane of FIG. 3. Each one of the pair of locking portions 32 has a locking hole 32b. The lower front plate 29 is provided with locking projections 29a. The pair of locking portions 32 provided for the upper front plate 27 are pressurized upward in FIG. 3 by the hoisting mechanism 40. Accordingly, with the locking projections 29a disposed one-to-one in the locking holes 32b, the locking portions 32 abut on the respective locking projections 29a since the locking portions 32 are urged upward, so that the locking portions 32 lock due to the locking projections 29a. Thus, the upper conveyance module 41 is locked to the lower conveyance module 42, so that the state in FIG. 3 is retained as the state where the upper conveyance module 41 is shut. The pair of locking portions 32 and the locking projections 29a serve as a holder that holds the open and close portion shut.

The lower rear plate 30 is provided with a rotation center 33. The upper rear plate 28 is coupled to the rotation center 33, and the upper conveyance module 41 turns around the rotation center 33.

Figure 4:
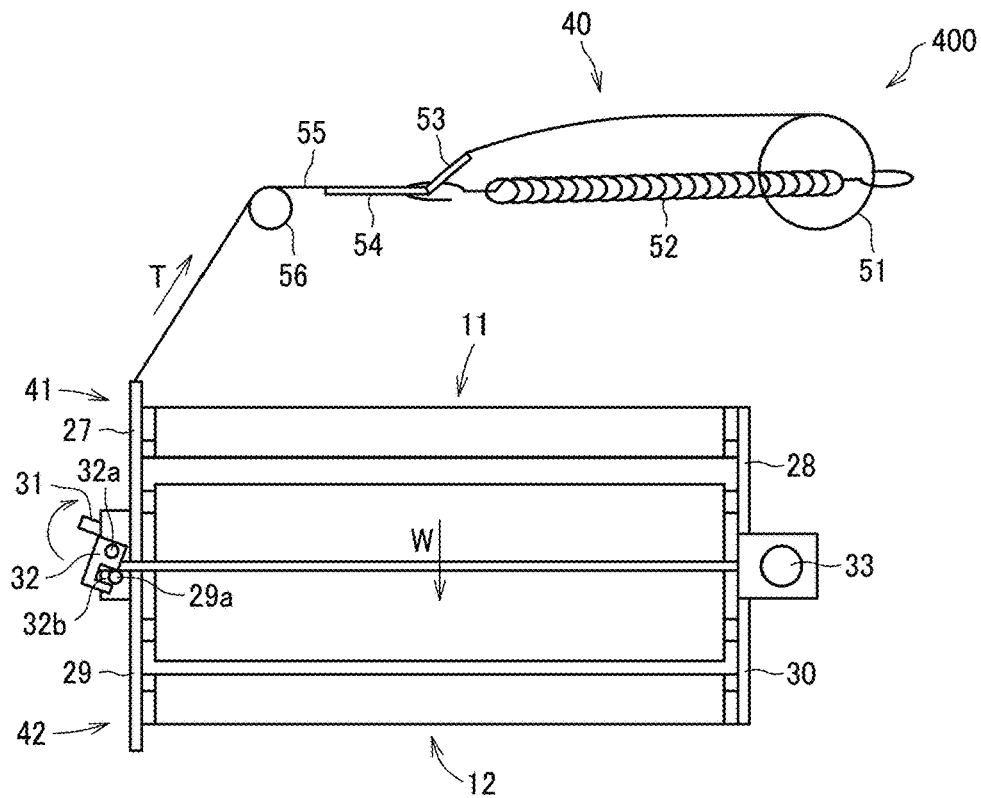
FIG. 4 is a side view of the sheet conveyor of FIG. 2 with the upper conveyance module unlocked, according to an embodiment of the present disclosure.

FIG. 4 is a side view of the sheet conveyor 400 of FIG. 2 with the upper conveyance module 41 unlocked, according to the present embodiment.

In order to open the upper conveyance module 41, the handle 31 is turned upward while being gripped, so that the locking portions 32 turn around the rotation shaft 32a as in FIG. 4. Due to such a configuration, the locking projections 29a are separated from the locking holes 32b, so that the upper conveyance module 41 is unlocked to the lower conveyance module 42. The pair of locking portions 32 and the locking projections 29a serve as a latch mechanism that keeps the upper conveyance module 41 locked until unlocking due to a manipulation of the handle 31.

Figure 5:
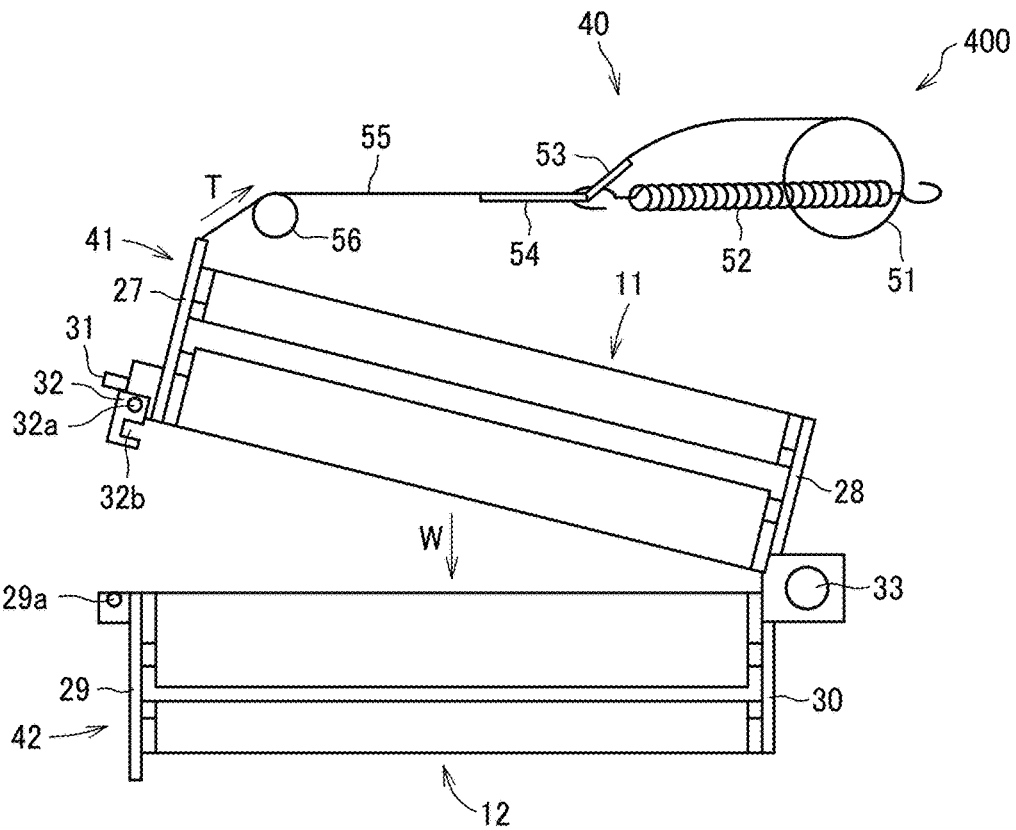
FIG. 5 is a side view of the sheet conveyor of FIG. 2 with the upper conveyance module open, according to an embodiment of the present disclosure.

FIG. 5 is a side view of the sheet conveyor 400 of FIG. 2 with the upper conveyance module 41 open, according to the present embodiment.

As illustrated in FIG. 5, the upper conveyance module 41 turns in the opening direction around the rotation center 33 due to the biasing force T of the hoisting mechanism 40. The biasing force T of the hoisting mechanism 40 is larger than the self-weight W of the upper conveyance module 41. Thus, unlocking the upper conveyance module 41 to the lower conveyance module 42 causes the upper conveyance module 41 to turn automatically in the opening direction. Thus, the face for sheet conveyance between the upper conveying belt 11 and the lower conveying belt 12 is exposed outward, so that paper jam can be handled. In addition, members inside the sheet conveyor 400 can be replaced.

Figure 6:
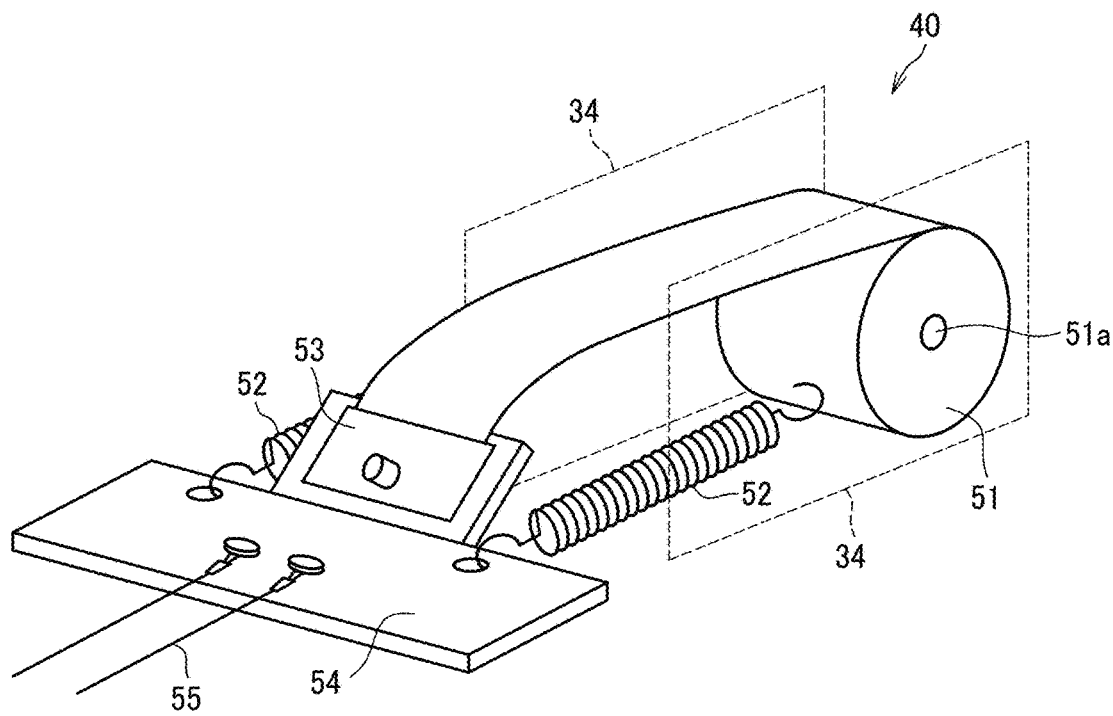
FIG. 6 is a perspective view of a hoisting mechanism, according to an embodiment of the present disclosure.

FIG. 6 is a perspective view of the hoisting mechanism 40, according to the present embodiment.

The configuration or structure of the hoisting mechanism 40 is described below in detail with reference to FIG. 6.

The hoisting mechanism 40 includes, for example, a first spring 51, a second spring 52, a sub-plate 53, a slider 54, and a wire 55 as a linear member. The first spring 51 serves as a constant load spring that is constant in biasing force (load) regardless of stroke. In the present embodiment, a conston spring is used for the first spring 51. The second spring 52 serves as a spring that is variable in load due to stroke. A coil spring is used for the second spring 52. In the present embodiment, such second springs 52 are arranged on both sides of the first spring 51. The first spring 51 has an end to which the sub-plate 53 is attached. The sub-plate 53 is coupled to the slider 54 tabular in shape. Each second spring 52 has an end attached to the slider 54 and the other end secured to a housing 34 of the sheet conveyor 400. The wire 55 has an end coupled to the upper front plate 27 and the other end coupled to the slider 54.

The first spring 51 has both sides supported by the housing 34. The first spring 51 is arranged so as to be rotatable around a rotation center 51a relative to the housing 34. The first spring 51 rotates to wind up or off its spring portion. As described above, the first spring 51 according to the present embodiment is a winding spring such as a conston spring.

In the present embodiment, against the weight W of the upper conveyance module 41 illustrated in FIG. 5, the hoisting mechanism 40 applies the biasing force T exceeding the weight W to bias the upper conveyance module 41 in the opening direction. The biasing force T is the sum of the biasing force of the first spring 51 as a constant load spring and the biasing force of the second springs 52 variable in load due to stroke.

As the upper conveyance module 41 moves in the opening direction, the stroke of each second spring 52 decreases, so that the biasing force in the opening direction due to the second springs 52 decreases. Accordingly, as the upper conveyance module 41 opens, the rate of opening decreases. Then, with the biasing force T and the weight W in balance, the movement of the upper conveyance module 41 in the opening direction stops.

In order to shut the upper conveyance module 41, the operator turns the upper conveyance module 41 against the biasing force T until the state in FIG. 4 is obtained, and then hooks the locking portions 32 together with the locking projections 29a.

Due to such a configuration, the upper conveyance module 41 can be shut again. In both the state where the upper conveyance module 41 is shut in FIG. 3 and the state where the upper conveyance module 41 is open in FIG. 5, the first spring 51 has the spring portion partially reeled out. Thus, the first spring 51 keeps biasing force applied to the upper conveyance module 41.

As described above, according to the present embodiment, with a configuration in which the biasing force T is larger than the weight W of the upper conveyance module 41, unlocking between the pair of locking portions 32 and the locking projections 29a enables the upper conveyance module 41 to move automatically in the opening direction. Accordingly, a series of operations to open the upper conveyance module 41 can be easily carried out. In particular, in the present embodiment, since the upper conveyance module 41 is provided with the cooling member 14 inside and the image forming apparatus 1 including the sheet conveyor 400 is a large printing machine, the upper conveyance module 41 is large in weight. However, the upper conveyance module 41 large in weight can be easily opened. The state where the upper conveyance module 41 is open can be retained without the application of external force, leading to the facilitation of working, such as handling of paper jam.

Furthermore, with a configuration in which biasing force is applied to the upper conveyance module 41 by the second springs 52 variable in load due to stroke, the rate in the opening direction of the upper conveyance module 41 can reduce, leading to a stop. Due to such a configuration, the rate of opening of the upper conveyance module 41 can be controlled, and the upper conveyance module 41 can be stopped at a predetermined position in the opening direction without any restricting members. Since the first spring 51 as a constant load spring is provided, the manipulation force to shut the upper conveyance module 41 is small. In other words, the stroke and biasing force of the second springs 52 are in proportion. Thus, for example, in order to move the upper conveyance module 41 with only the second springs 52 for the state of opening in FIG. 5, a large biasing force is required, leading to an increase in the spring constant of each second spring 52. However, in this case, if the second springs 52 have a stoke quantity such that the upper conveyance module 41 transitions from the state in FIG. 3 to the state in FIG. 5, the biasing force T in the state of opening in FIG. 3 is excessively larger than the weight W since the spring constant of each second spring 52 is large. In other words, the manipulation force to manipulate the upper conveyance module 41 into the state of opening is large. In the present embodiment, as the first spring 51, which is a constant load spring, and the second springs 52 are used in combination, each one of the second springs 52 has a small spring constant. Thus, even when the stroke of the second springs 52 lengthens, the biasing force of the second springs 52 is kept small, so that the manipulation force to shut the upper conveyance module 41 is small.

As described above, in the present embodiment, the first spring 51, which is a constant load spring, and the second springs 52 whose load is variable depending on the stroke bias the upper conveyance module 41 in the opening direction. Thus, the open/shut operation of the upper conveyance module 41 can be easily carried out.

In the present embodiment, as illustrated in FIG. 3, the upper conveyance module 41 is positioned to the lower conveyance module 42 with a state where the lower wall face of the locking hole 32b of each one of the pair of locking portions 32 abuts on the corresponding locking projection 29a. Thus, the upper conveying belt 11 and the lower conveying belt 12 are disposed in a proper positional relationship, so that a conveyance nip is formed between the upper conveying belt 11 and the lower conveying belt 12 in the proper positional relationship.

As illustrated in FIG. 3, the wire 55 partially abuts on a pulley 56 that serves as an abutment part. Since the wire 55 abuts on the pulley 56, before and behind the pulley 56, a change is made in the direction in which the wire 55 extends. Due to the pulley 56, the direction in which the hoisting mechanism 40 applies biasing force to the wire 55 can be changed, and the degree of freedom with which the hoisting mechanism 40 is designed, such as the arrangement of the hoisting mechanism 40, increases. Thus, the hoisting mechanism 40 can be disposed at a position to which the operator gains no access, so that, for example, the first spring 51 can be prevented from being touched by the operator. In the sheet conveyor 400 according to the present embodiment, because no member is allowed to be disposed in the region through which a sheet passes, hoisting with the wire 55 from above is favorable.

Due to the pulley 56 that rotates as an abutment part, the open/shut operation of the upper conveyance module 41 can be smoothly carried out with a low frictional force between the wire 55 and the pulley 56. For example, a roller that does not rotate may be used as an abutment part.

Figure 7:
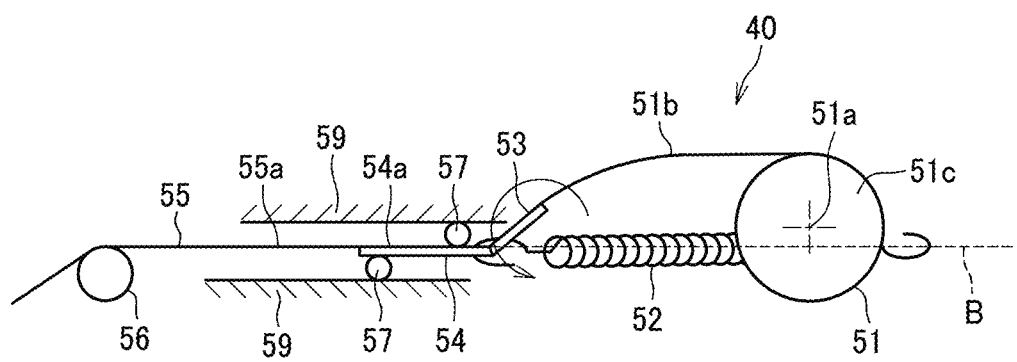
FIG. 7 is a side view of a guide provided for a hoisting mechanism, according to an embodiment of the present disclosure.

FIG. 7 is a side view of a pair of guides 59 provided for the hoisting mechanism 40, according to an embodiment of the present disclosure.

In the present embodiment, a guide is arranged that guides the slider 54 in the stroke direction of the first spring 51 or the second springs 52 to prevent the first spring 51 from twisting. Specifically, as illustrated in FIG. 7, the slider 54 has an upper face abutting on a guide 59 through a rolling bearing 57 and a lower face abutting on the pair of guide 59 through a rolling bearing 57. Thus, at the time of changes in the stroke quantities of the first spring 51 and the second springs 52, the slider 54 can be guided along the surfaces of the pair of guides 59, so that the first spring 51 can be restricted from twisting. In particular, since the slider 54 abuts on the rolling bearings 57, the manipulation force for open/shut operation of the upper conveyance module 41 can be reduced with a low sliding resistance between the slider 54 and the guide 59. The stroke direction of the first spring 51 or the second springs 52 in which the slider 54 is guided corresponds to the left-right direction of FIG. 7.

Figure 8:
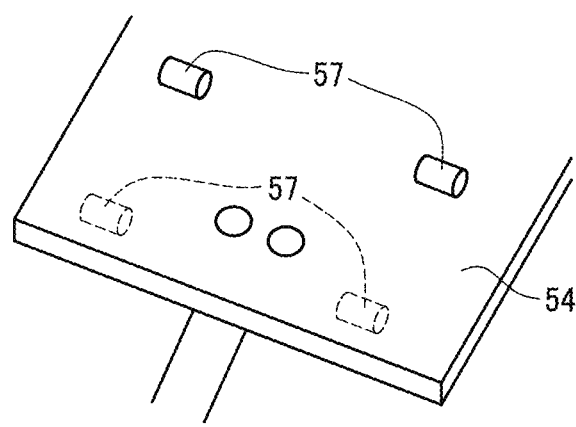
FIG. 8 is a perspective view of a plurality of bearings provided for a slider, according to an embodiment of the present disclosure.

FIG. 8 is a perspective view of the multiple bearings 57 provided for the slider 54, according to an embodiment of the present disclosure.

As illustrated in FIG. 8, rolling bearings 57 abut on the slider 54 at four places: two places on the left and right sides at the front of the slider 54 and two places on the left and right sides at the rear of the slider 54. Such a configuration stabilizes the direction in which the slider 54 moves.

Figure 9:
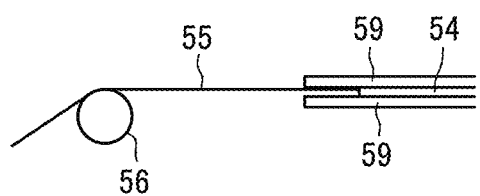
FIG. 9 is a side view of a guide according to an alternative embodiment of the present disclosure.

FIG. 9 is a side view of a pair of guides 59 according to an alternative embodiment of the present disclosure.

The pair of guides 59 that guide the slider 54 is not limited to a configuration or structure with the bearings 57 described above. For example, as illustrated in FIG. 9, the pair of guides 59 may be arranged that slide above and blow the slider 54 to restrict the direction in which the slider 54 moves. In the present embodiment, the pair of guides 59 are formed of sheet metal. Such a configuration in which bearings are arranged as a guide as described above is preferable because of a low sliding resistance between the slider 54 and the guide. A guide may be achieved with the housing of a sheet conveyor. A type of bearing different from such a rolling bearing 57 may be adopted as a bearing.

As illustrated in FIG. 7, the rotation center 51a of the first spring 51 is arranged on the same side as a winding portion 51b of the first spring 51 with respect to an extended plane B obtained by extending a coupling face 54a on which the wire 55 is coupled to the slider 54. Thus, even when the stroke shortens due to the winding-up of the first spring 51, the winding portion 51b of the first spring 51 can be prevented from expanding upward in FIG. 7. Due to such a configuration, the winding portion 51b can be wound up smoothly, and the region that is occupied by the first spring 51 can be reduced. The winding portion 51b corresponds to a portion that is part of the spring portion of the first spring 51 and is disposed between a drum 51c for winding up the spring portion and the sub-plate 53 with the slider 54. In other words, on the drawing plane of FIG. 7 that is a plane perpendicular to the virtual axial direction of the rotation center 51a of the first spring 51 (the direction perpendicular to the drawing plane of FIG. 7), with respect to an extended line B resulting from extension of a portion 55a that the wire 55 has between the slider 54 and the pulley 56, the rotation center 51a of the first spring 51 is arranged on the side on which the first spring 51 has the winding portion 51b. Thus, the winding portion 51b can be prevented from expanding upward in FIG. 7.

Figure 10:
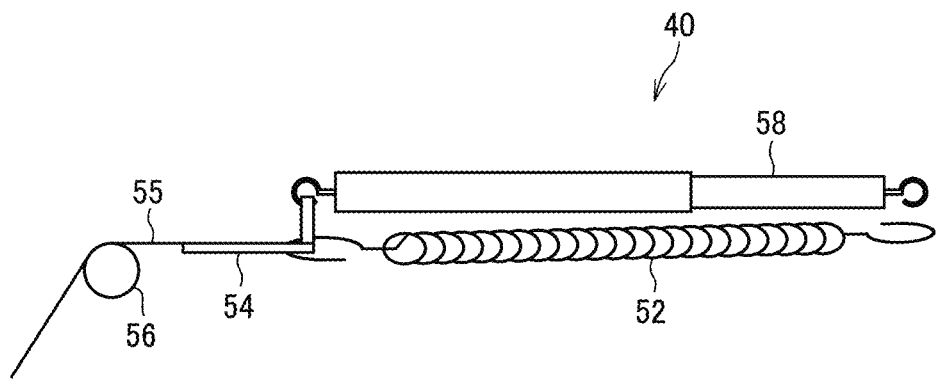
FIG. 10 is a side view of a hoisting mechanism according to an alternative embodiment of the present disclosure.

FIG. 10 is a side view of the hoisting mechanism 40 according to an alternative embodiment of the present disclosure.

In the above embodiment of the present disclosure, a conston spring is used as the first spring that is a constant load spring. However, no limitation on the embodiments of the present disclosure is intended thereby. For example, a hoisting mechanism 40 according to the present embodiment described with reference to FIG. 10 includes a gas spring as a first spring 58. In a similar manner to the above embodiment of the present disclosure, the biasing force in the direction of contraction of the first spring 58 is applied to an open and close portion through a wire 55. In a similar manner to the case where a conston spring is used as the first spring, with the configuration of the hoisting mechanism 40 according to the present embodiment, the open/shut operation of the open and close portion can be easily carried out. Depending on the configuration of an open and close device, the use of a gas spring as the first spring enables a reduction in cost. The use of a conston spring as the first spring enables a long stroke.

Figure 11:
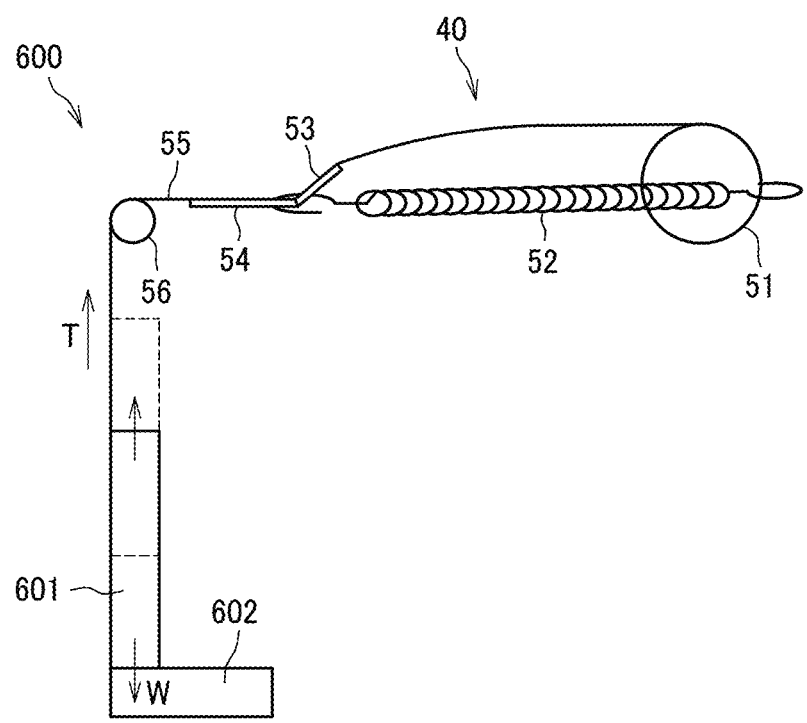
FIG. 11 is a side view of an open and close device according to an alternative embodiment of the present disclosure.

FIG. 11 is a side view of an open and close device according to an alternative embodiment of the present disclosure.

In the open and close device according to the above embodiment of the present disclosure, the upper conveyance module 41, which is the open and close portion, turns around the rotation center 33 to open or shut. However, no limitation on the embodiments of the present disclosure is intended thereby. For example, an open and close device 600 illustrated in FIG. 11 includes an open and close portion 601 that slides in the up-down direction, a fixed unit 602, a holder that holds the open and close portion 601 at the position, at which the open and close portion 601 is shut, indicated with a solid line in FIG. 11, and a hoisting mechanism 40 as a biasing mechanism. With biasing force T larger than the weight W of the open and close portion 601, the hoisting mechanism 40 urges the open and close portion 601. Due to the biasing force T, the open and close portion 601 opens to the position indicated with a dotted line in FIG. 11. The operator manipulates the open and close portion 601 to the position indicated with the solid line in FIG. 11 such that the open and close portion 601 is held by the holder, so that the open and close portion 601 is shut. In a similar manner to the above embodiment of the present disclosure, the open/shut operation of the open and close portion 601 according to the present embodiment can be easily carried out.

Although the image forming apparatus 1 according to the above embodiments of the present disclosure includes the feeder 100, the image former 200, the dryer 300, and the ejector 500, other functions may be appropriately added to the image forming apparatus 1. For example, a pre-processing unit that performs pre-processing for image forming can be added between the feeder 100 and the image former 200 or a post-processing unit that performs post-processing for image forming can be added between the dryer 300 and the ejector 500.

An exemplary pre-processing unit performs treatment-liquid coating to coat, onto a sheet P, treatment liquid that reacts with ink to prevent blurring. The pre-processing to be performed by the pre-processing unit is not limited to any particular processing. An exemplary post-processing unit performs sheet reversing and conveying to reverse the sheet on which an image is formed by the image former 200 and convey the reversed sheet to the image former 200 again for double-sided image forming to the sheet. Another exemplary post-processing unit performs processing to bind a plurality of sheets each having an image formed. The post-processing units may be, for example, a correction mechanism that corrects sheet deformation and a cooling mechanism that cools a sheet. The post-processing to be performed by the post-processing unit is not limited to any particular processing.

In the present embodiment, an exemplary inkjet image forming apparatus is described. The image forming apparatus is not limited to an apparatus including a liquid discharge head that discharges liquid to the dried face of a recording medium to visualize a meaningful image such as a character or a figure. Examples of the "image forming apparatus" include an apparatus that forms a meaningless pattern. The material of such a recording medium is not limited and may be any material to which liquid can adhere even temporarily such as paper, thread, fiber, fabric, leather, metal, plastic, glass, wood, or ceramic. The material may be any of the materials used for film products, cloth products such as clothes, construction materials, such as wallpaper and flooring, and leather products. The image forming apparatus may include, for example, means for feeding, conveying, and ejecting a medium to which liquid can adhere, a pre-processing device, and a post-processing device.

The term "liquid" may have any viscosity or surface tension as long as the liquid can be discharged from a head, and is not limited to any particular liquid. Preferably, such liquid to be discharged has a viscosity equal to or lower than 30 mPa s at normal temperature and under normal atmospheric pressure or due to heating or cooling. More specific examples of the liquid include a solution, a suspension, and an emulsion that contain a solvent, such as water or an organic solvent, a colorant, such as dye or pigment, a functional material, such as a polymerizable compound, resin, or a surfactant, a biocompatible material, such as deoxyribonucleic acid (DNA), an amino acid, protein, or calcium, or an edible material such as a natural pigment. Such a solution, a suspension, and an emulsion can be used, for example, for inkjet inks and surface treatment liquids.

The image forming apparatus may be, but is not limited to, an apparatus in which a liquid discharge head and a recording medium move relatively. Concrete examples of such an apparatus include, for example, a serial head apparatus that moves a liquid discharge head and a line head apparatus that does not move a liquid discharge head.

The liquid discharge head is a functional component that discharges/jets liquid through a discharge hole (nozzle). As a source that generates energy to discharge liquid, used can be means for generating energy for discharge, such as a piezoelectric actuator (laminated piezoelectric element or thin-film piezoelectric element), a thermal actuator including an electrothermal conversion element such as a heating resistive element, and an electrostatic actuator including a diaphragm and opposed electrodes. The means to be used for generating energy for discharge is not limited.

Furthermore, the open and close device embodiments of the present disclosure may be applied to the configuration or structure of, for example, a sheet conveyor provided for an electrophotographic image forming apparatus.

By way of example, aspects of the present disclosure are given below.

First Aspect

An open and close device includes an open and close portion to open or shut, a biasing mechanism to bias the open and close portion in an opening direction, and a holder to hold the open and close portion shut. The biasing mechanism includes a first spring whose biasing force is invariable regardless of a stroke of the first spring, and a second spring whose biasing force is variable due to a stroke of the second spring.

Second Aspect

In the open and close device according to the first aspect, the first spring is a retractable spring.

Third Aspect

In the open and close device according to the second aspect, the biasing mechanism further includes a slider disposed between the first spring and the open and close portion, the slider sliding in response to a change in the stroke of the first spring, and a linear member disposed between the first spring and the open and close portion to hoist the open and close portion, and the first spring has a rotation center on a same side as a winding portion of the first spring with respect to an extended plane obtained by extending a coupling surface on which the linear member is coupled to the slider.

Fourth Aspect

In the open and close device according to the second aspect, the biasing mechanism further includes a slider disposed between the first spring and the open and close portion, the slider sliding in response to a change in the stroke of the first spring, a linear member disposed between the first spring and the open and close portion to hoist the open and close portion, and an abutment part disposed between the first spring and the open and close portion, the abutment part contacting the linear member to change a direction of extension of the linear member, and the first spring has a rotation center on a same side as a winding portion of the first spring with respect to an extended line obtained by extending a portion of the linear member between the slider and the abutment part on a plane perpendicular to a direction of a rotation axis of the first spring.

Fifth Aspect

In the open and close device according to the first aspect or the second aspect, the biasing mechanism further comprises a linear member to hoist the open and close portion.

Sixth Aspect

The open and close device according to the fifth aspect further includes an abutment part to contact the linear member to change a direction of extension of the linear member.

Seventh Aspect

In the open and close device according to any one of the first to sixth aspects, the biasing mechanism further includes a slider disposed between the first spring and the open and close portion, the slider sliding in response to a change in the stroke of the first spring, and a guide disposed between the first spring and the open and close portion, the guide guiding the slider in a direction of the stroke of the first spring or in a direction of the stroke of the second spring.

Eighth Aspect

In the open and close device according to the seventh aspect, the biasing mechanism further includes a bearing, and the guide is to guide the slider through the bearing.

Ninth Aspect

A sheet conveyor includes the open and close device according to any one of the first to eighth aspects, and the open and close portion includes a conveyor to convey a sheet.

Tenth Aspect

An image forming apparatus includes the sheet conveyor according to the ninth aspect.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An open and close device comprising:
an open and close portion to open or shut;
a biasing mechanism to bias the open and close portion in an opening direction; and
a holder to hold the open and close portion shut,
the biasing mechanism including a first spring whose biasing force is invariable regardless of a stroke of the first spring, and a second spring whose biasing force is variable due to a stroke of the second spring.

2. The open and close device according to claim 1, wherein the first spring is a retractable spring.

3. The open and close device according to claim 2,
wherein the biasing mechanism further comprises:
- a slider disposed between the first spring and the open and close portion, the slider to slide in response to a change in the stroke of the first spring; and
- a linear member disposed between the first spring and the open and close portion, the linear member to hoist the open and close portion, and
- wherein the first spring has a rotation center on a same side as a winding portion of the first spring with respect to an extended plane obtained by extending a coupling surface on which the linear member is coupled to the slider.

4. The open and close device according to claim 2,
wherein the biasing mechanism further comprises:
- a slider disposed between the first spring and the open and close portion, the slider to slide in response to a change in the stroke of the first spring;
- a linear member disposed between the first spring and the open and close portion, the linear member to hoist the open and close portion; and
- an abutment part disposed between the first spring and the open and close portion, the abutment part to contact the linear member to change a direction of extension of the linear member,
- wherein the first spring has a rotation center on a same side as a winding portion of the first spring with respect to an extended line obtained by extending a portion of the linear member between the slider and the abutment part on a plane perpendicular to a direction of a rotation axis of the first spring.

5. The open and close device according to claim 1,
wherein the biasing mechanism further comprises a linear member to hoist the open and close portion.

6. The open and close device according to claim 5, further comprising
an abutment part to contact the linear member to change a direction of extension of the linear member.

7. The open and close device according to claim 1,
wherein the biasing mechanism further comprises:
- a slider disposed between the first spring and the open and close portion, the slider to slide in response to a change in the stroke of the first spring; and
- a guide disposed between the first spring and the open and close portion, the guide to guide the slider in a direction of the stroke of the first spring or in a direction of the stroke of the second spring.

8. The open and close device according to claim 7,
wherein the biasing mechanism further includes a bearing, and wherein the guide is to guide the slider through the bearing.

9. A sheet conveyor comprising
an open and close device including:
- an open and close portion to open or shut;
- a biasing mechanism to bias the open and close portion in an opening direction; and
- a holder to hold the open and close portion shut,
the biasing mechanism including a first spring whose biasing force is invariable regardless of a stroke of the first spring, and a second spring whose biasing force is variable due to a stroke of the second spring,
the open and close portion including a conveyor to convey a sheet.

10. An image forming apparatus comprising
a sheet conveyor comprising
an open and close device including:
- an open and close portion to open or shut;
- a biasing mechanism to bias the open and close portion in an opening direction; and
- a holder to hold the open and close portion shut,
the biasing mechanism including a first spring whose biasing force is invariable regardless of a stroke of the first spring, and a second spring whose biasing force is variable due to a stroke of the second spring,
the open and close portion including a conveyor to convey a sheet.

* * * * *